Patented Oct. 17, 1950

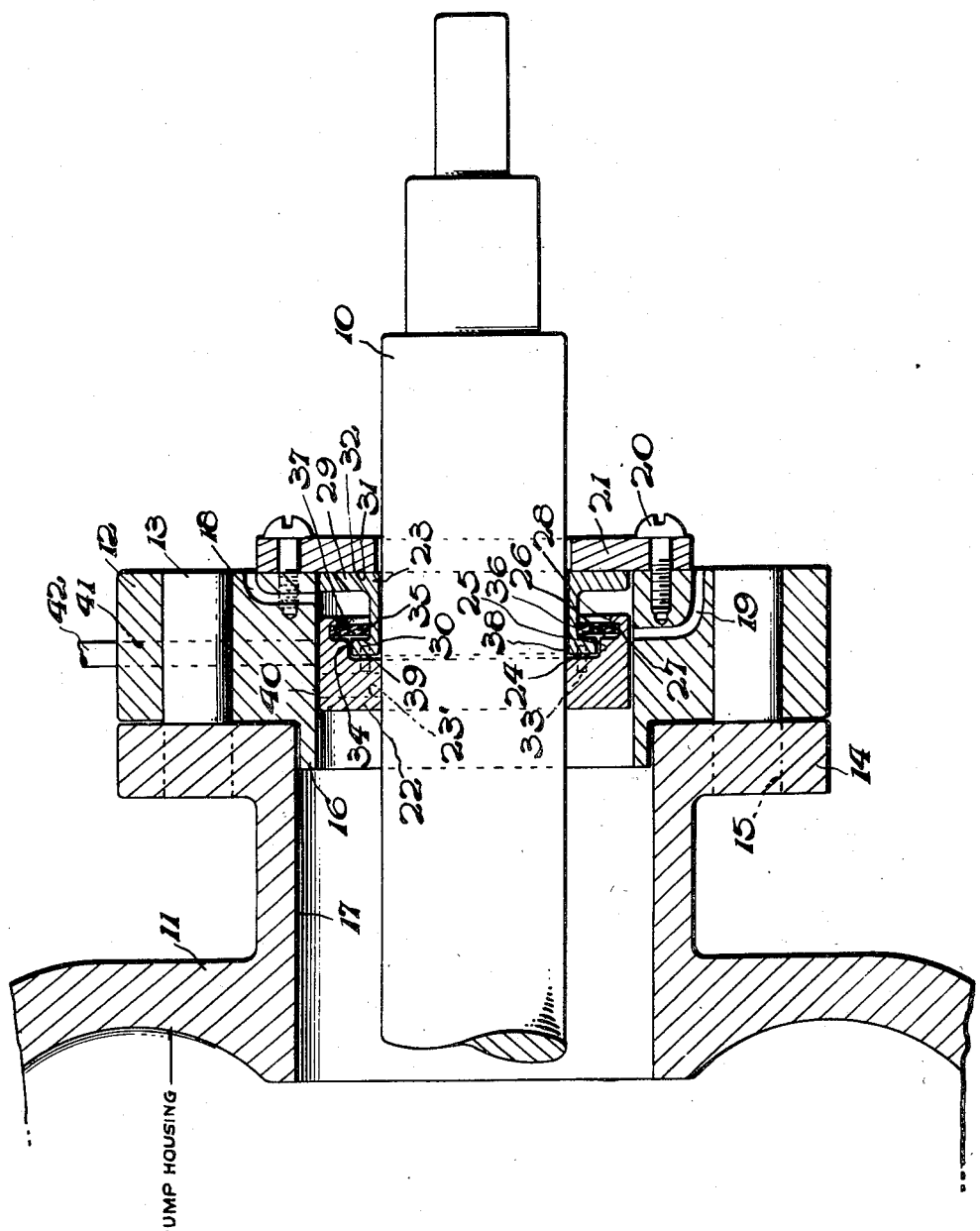

2,526,590

UNITED STATES PATENT OFFICE 2,526,590

SHAFT SEAL

Orran B. Summers, Long Beach, Calif., assignor of fifteen per cent to Edward J. Sullivan and six per cent to Donald A. Ostrander Application April 22, 1946, Serial No. 664,055

6 Claims. (Cl. 286—11)

This invention relates to shaft seals, and more particularly to mechanical sealing devices for use in association with rotating shafts and suitable for sealing against leakage of liquids, gases, vapors, sludges, slurries, etc.

Conventional shaft seals employ some form of gland which incorporates packing material placed under compression to fill the clearance between the shaft and the surrounding casing wall. If the packing material is placed under sufficient compression so as to grip the surface of the shaft sufficiently to assure against substantial leakage, there is a material loss of energy because of the friction set up between the rotating shaft and the stationary packing material. In fact, the rubbing of the packing material on the shaft frequently results in the grooving of the shaft or a sleeve carried thereby, with resultant loss of sealing relationship, which must be followed by a machining of the shaft to remove the groove, with ultimate need of shaft replacement following a few resizing operations, or a shaft sleeve renewal. Furthermore, it is extremely difficult, if possible, to tighten up such packing and obtain even pressure on the shaft, whereby in many cases an unbalanced pressure is created which causes shaft deflection and rapid internal wear on parts associated with the shaft. The aforesaid need for frequently adjusting and replacing packing also involves high labor and material costs as well as losses of time when the equipment is out of service.

Various schemes have heretofore been proposed for eliminating the necessity of tight rubbing packing to prevent escape of fluid between the shaft and the wall of the opening through which it passes, chiefly involving constructions of various forms wherein a rubbing element is maintained in contact with an opposed element by spring pressure. This type of construction has not proved satisfactory because the springs are frequently broken, through crystallization or other causes, while the rubbing element itself is subject to fatigue under the conditions of temperature and pressure to which it is likely to be subjected. Furthermore, such constructions require that a relatively small clearance be maintained between the relatively movable elements, and as these elements are subject to erosion and corrosion, and foreign matter may get into the clearance space, they not infrequently become "frozen" together, causing the seal to become ineffective, so that it has to be dismantled and repaired.

It is an object of this invention to provide an improved sealing device which is of wide utility and can be applied to sealing against the escape of liquids, gases, vapors, sludges, slurries and other flowable materials and which at the same time overcomes the foregoing objections.

Another object of this invention is to provide an improved sealing device which can operate with relatively low contact pressure between relatively movable elements even though said sealing device is used in association with relatively high internal pressures.

Another object of this invention is to provide an improved sealing device which will successfully maintain the seal under high temperatures, under erosive conditions, when sealing against the escape of sludges and other fluids containing solids, etc.

Another object of this invention is to provide an improved sealing device which does not interfere with the lateral or end play of the shaft.

Another object of this invention is to provide an improved sealing device wherein the relatively movable sealing elements are disposed outside of any space to which the fluid within the casing has access so as to avoid the presence of clearances which are subject to erosion, corrosion, plugging by foreign material, etc., due to the access of such fluid to such clearances.

Another object of this invention is to provide an improved sealing device wherein the clearance between the relatively movable sealing elements are sealed by a flexible element from the fluid-containing spaces of the seal.

Another object of this invention is to provide an improved sealing device which can be readily adapted to conditions wherein internal pressures are below atmospheric pressure.

Another object of this invention is to provide an improved sealing device which is of simple and rugged construction, which is composed of a minimum number of parts, which can be manufactured at low cost, and which is economical in service.

Another object of this invention is to provide an improved sealing device which can be readily and economically applied to existing equipment as well as incorporated in new equipment.

Another object of this invention is to provide an improved sealing device which can be so applied as not only to eliminate conventional stuffing boxes, but one that will permit bearings to be placed nearer to the rotors, vibrations to be decreased, running clearances to be made smaller and efficiencies to be increased.

Other objects will appear as the description of the invention proceeds.

The invention is capable of receiving a variety of mechanical expressions only one of which has been shown on the accompanying drawing, but it is to be expressely understood that the drawing is for purposes of illustration only and is not to be construed as a definition of the limits of the invention, reference being had to the appended claims for that purpose.

The drawing illustrates in axial section and somewhat diagrammatically an embodiment of the present invention.

In the form shown, any suitable shaft 10 is associated with any suitable casing 11, such as a pump casing for pumping liquids, gases, vapors, sludges, slurries, etc. However, as will be readily understood by those skilled in the art, the present invention is not limited to use in conjunction with a pump. The form of the invention illustrated on the drawing is designed for application to an existing installation, to take the place of the stuffing box, mechanical seal or what not already supplied therefor, although as will be understood the parts to be referred to may be replaced by suitable elements appropriate for incorporation of the seal to be described in new equipment.

As illustrated, 12 designates a collar, which may be made in a single piece or formed in two pieces so that it may be assembled around a shaft in position, said collar taking the place of the packing gland provided with the shaft, and therefore it is illustrated as drilled at 13 so that it can be mounted on the flange 14 of the machine housing by use of the gland bolts (not shown) passing through holes 15 in said flange. Collar 12 is also preferably provided with an inwardly extending flange 16 the outer surface of which may be machined to fit the opening 17 in the housing 11 through which the shaft 10 passes and which in existing installations is normally of a size to receive the stuffing box. Thereby the collar 12 is suitably centered in the opening 17 in a position which is concentric with the shaft. Collar 12 may be provided with a suitable lubrication passage 18 for introduction of a lubricant to the rubbing surfaces hereinafter referred to, and if desired, the collar 12 may also be provided with a drain opening 19 which may be closed in any suitable way when the drain is not to be used.

Suitably mounted on the collar 12 as by screws 20 is the stationary contact element 21, preferably made in halves to facilitate renewal. This contact element may be made of any suitable material, but it is preferably made softer than the cooperating contact element to be described so that substantially all of the wear will occur at contact element 21. As this element is mounted exteriorly of the sealing unit where it is easily accessible, it may be readily replaced whenever needed and at relatively low cost.

Mounted for rotation with the shaft is a unit composed of two generally cylindrical members 22 and 23. Member 22 is rigidly attached to the shaft, as by set screws indicated in dotted line at 23', so as to form a fluid-tight joint with the shaft. Interiorly, member 22 has a radially extending surface 24 terminating in a shoulder 25 from which extends a second radially extending surface 26. The latter surface terminates in an inwardly facing channel or groove 27 formed between said surface 26 and an inwardly projecting flange 28. Member 23 is channel-shaped in axial section, having a radially projecting flange 29 constituting the second contact element for cooperation with element 21 and a second radially extending flange 30 at its opposite extremity of less radial extent and adapted to be received with small clearance within the recess provided by the radial surface 24 and the shoulder 25, said flange having only a bearing clearance with the surface of said shoulder when the parts are concentric. At least the flange 29 of member 23 is of harder material than the element 21, being preferably case hardened to a degree such that practically all of the wear occurring between the relatively rotatable surfaces 31 and 32 will occur at the latter. Said rubbing surfaces can be readily lubricated by oil or the like introduced through the oil hole 18.

Rotation of member 23 with member 22 is enforced by pins 33 securely fastened to one of the members 22 and 23 and fitting loosely into openings provided in the other of these two members, so that member 23 may float freely and thereby permit end movement or lateral play of the shaft while maintaining alignment of the member 23 to effect proper sealing contact between the relatively rotatable rubbing surfaces 31 and 32.

Mounted in the groove 27 heretofore disclosed and adapted to seal the bearing clearance 34 between the flange 30 and the opposed surface on shoulder 25 is a flexible diaphragm 35 composed of any suitable material such as rubber, leather, metal, etc., the material selected being such as to avoid deterioration under the conditions of temperature, pressure, erosion, corrosion, chemical reaction, etc., which are likely to be encountered by reason of the fluid to which it may be subjected. Diaphragm 35 is of such construction and radial extent teat it makes snug and fluid-tiget engagement with the bottom surface of the groove 27 and the surface 36 on the member 23. This diaphragm is therefore a sealing member separating the chamber 37 between the rotatable elements 22 and 23 from the clearance 34 between said members, and as said diaphragm is of flexible construction, it imposes substantially no restraint on the designed axial floating movement of the member 23. Said diaphragm 35, as will be observed, is subjected to the pressure of the atmosphere through the clearance 38 between member 23 and the shaft, the gap 39 between surface 24 and flange 30, and the before-mentioned clearance 34, while on its opposite face it is subjected in the chamber 37 to the pressure of the fluid within the housing 11 through the clearance 40 between the collar 12 and the rotatable member 22.

In conformity with the present invention, and as before mentioned, the flange 30 is of less radial extent than the flange 29 so that a differential pressure will be imposed on said two flanges due to the pressure within the chamber 37 communicated thereto from the interior of the housing 11. The difference in the radial extent of said two flanges is determined by the contact pressure desired between surfaces 31 and 32 and the pressure within the housing 11 as transmitted to said chamber 37. As will be apparent, the difference in effective area between the inner radial face of flange 29 and the inner radial face of flange 30 multiplied by the pressure in said chamber 37 determines the unbalanced pressure acting on the floating member 23 and pressing the surface 31 against the surface 32. Knowing the pressure interiorly of the casing 11, this differential area and differential pressure can be nicely predetermined so as to obtain the desired contact pressure between the relatively rotatable rubbing surfaces 31 and 32. Thus any desired low contact pressure may be maintained even though the pressure within the housing 11 be relatively high.

In the event that the pressure within the housing 11 is a negative pressure the invention is still readily adaptable to such conditions, because the chamber 37 may then be subjected from any suitable external source, such as for example a point of positive pressure in a fluid line communicating with the housing 11, to fluid under a positive pressure, as by means of the passage or conduit 41 in the collar 12 leading from any suitable conduit 42 to the clearance 40 before referred to.

It will therefore be perceived that by the present invention an improved mechanical seal has been provided which employs relatively rotatable contacting members between which any desired unit contact pressure may be maintained without reliance on springs or the like. Said unit contact pressure may be made of any desired value without regard to the pressure in the machine housing 11 by suitably predetermining the unbalanced area on flange 29 subjected to the pressure in the chamber 37, and therefore even though the pressure in the housing 11 be relatively high, any suitable low contact pressure may be maintained between the surfaces 31 and 32. At the same time the clearance between the relatively movable members 22 and 23 is entirely sealed off from the fluid within housing 11 so that such clearances are not subject to erosion, corrosion, clogging, etc., because the fluid in the housing 11, while having access to the chamber 37, cannot reach the clearance between the bearing surfaces between the shoulder 36 and the periphery of flange 30. Also the flexible diaphragm 35 does not interfere with the member 23 having its designed floating action to maintain the proper contact pressure between the surfaces 31 and 32 while allowing for endwise and other movements of the shaft 10. Owing to the relative hardness of the flange 29 and the element 21 substantially all wear will occur at the contact face of the latter, and as element 21 is readily accessible and renewable it may be replaced at low cost and with a minimum loss of time for the equipment. Said contact surfaces may be readily lubricated as before pointed out, and therefore the loss of energy due to the maintenance of rubbing contacts, by suitably predetermining the contact pressure to be maintained between the surfaces 31 and 32, may be kept at a minimum.

Therefore, the high losses of energy incident to the use of packing glands has been avoided, and this is of particular importance when relatively high internal pressures are used because as is apparent the pressure on the gland material in conventional glands must be increased with increase of pressure of the fluid the leakage of which is to be prevented, whereas with the present invention the contact pressure is entirely independent of the pressure of the fluid within the housing so that the same contact pressure may be maintained between the relatively rotatable rubbing surfaces whether the pressure within the housing 11 be high or low. A sealing device in conformity with the present invention, as will now be apparent, involves no stationary member rubbing on the shaft or a shaft sleeve to produce grooving and require resizing. Therefore, the present invention provides a mechanical seal that not only avoids the use of conventional packing glands but overcomes the disadvantages characteristic of mechanical sealing devices as heretofore proposed.

While the invention as illustrated and described has been embodied in a device wherein a collar 12 has been provided for mounting on existing equipment by means of the gland bolts already present, it will now be apparent to those skilled in the art that said collar is in effect only a casing element for the relatively movable members 22 and 23, and therefore in new equipment the provision for encasing said members 22 and 23 may constitute a part of the machine housing 11, either integrally or by attachment thereto, and be so related to the parts associated with the shaft as to decrease overall dimensions, be closely associated with the related bearing or bearings, decrease vibration, etc. Therefore, in referring to a housing for the seal members it is to be expressly understood that the present invention contemplates that said housing may be provided by the housing of the machine unit or be a designed component of said unit as well as a separate member that can replace the stationary gland casing or other sealing device previously provided.

While the embodiment illustrated on the drawing has been described with considerable particularity, it is to be expressly understood that the invention is not limited thereto as the same is capable of receiving a variety of mechanical expressions, some of which will now suggest themselves to those skilled in the art, while changes may be made in the details of construction, arrangement, proportion of parts, materials, etc., without departing from the spirit of the invention. Reference is therefore to be had to the appended claims for a definition of the invention.

What is claimed is:

1. In a shaft sealing device, in combination with a shaft and surrounding housing means, a stationary contact element carried by said housing means and providing an annular contact surface, an annular member mounted on the shaft for rotation therewith and forming a fluid-tight joint therewith, an axially movable contact member interposed between said first-named element and said annular member, said contact member comprising a pair of radially extending flanges defining therebetween a chamber subjected to fluid pressure, said flanges having opposed inner surfaces of different areas subjected to the pressure in said chamber and the flange having the surface of larger area having an exterior contact surface in rubbing engagement with the contact surface on said first-named element, and means for rotating said contact member from said annular member, said flange on said contact member having the surface of smaller area projecting axially into said annular member and having axial bearing clearance with a surface on said annular member, and means for sealing said clearance.

2. In a shaft sealing device, in combination with a shaft and surrounding housing means, a stationary contact element carried by said housing means and providing an annular contact surface, an annular member mounted on the shaft for rotation therewith and forming a fluid-tight joint therewith, an axially movable contact member interposed between said first-named element on said annular member, said contact member comprising a pair of radially extending flanges defining therebetween a chamber subjected to fluid pressure, said flanges having opposed inner surfaces of different areas subjected to the pressure in said chamber and the flange having the surface of larger area having an exterior annular contact surface in rubbing engagement with the contact surface on said first-named element, means for rotating said floating member from said annular member, and a flexible diaphragm interposed between said contact member and said annular member to seal the pressure acting in said chamber on said contact member from the clearance between said contact member and said annular member.

3. In a shaft sealing device, in combination with a shaft and surrounding housing means, a stationary contact element carried by said housing means and providing an annular contact surface, an annular member mounted on the shaft for rotation therewith and forming a fluid-tight joint therewith, a generally cylindrical member channel-shaped in axial section mounted to float on said shaft between said first-named element and said annular member, said floating member having a radially extending flange provided with a contact surface for engagement with the contact surface on said first-named element and said floating member having a second radially extending flange telescopically received in said annular member and of less radial extent than said said first-named flange spaced from said first-named flange to provide a fluid pressure chamber therebetween, said flanges having opposed surfaces in said chamber subjected to fluid pressure with the area of the effective surface on said first-named flange greater than the area of the effective surface on said second-named flange whereby said contact surfaces are urged into engagement by a differential pressure defined by said differences in effective area multiplied by said fluid pressure, and means for rotating said floating member from said annular member, said smaller flange having axial bearing clearance with said annular member, and means for sealing said clearance.

4. In a shaft sealing device, in combination with a shaft and surrounding housing means, a stationary contact element carried by said housing means and providing an annular contact surface, an annular member mounted on the shaft for rotation therewith and forming a fluid-tight joint therewith, a generally cylindrical member channel-shaped in axial section mounted to float on said shaft between said first-named element and said annular member, said floating member having a radially extending flange provided with a contact surface for engagement with the contact surface on said first-named element and said floating member having a second radially extending flange of less radial extent than said first-named flange spaced from said first-named flange to provide a fluid pressure chamber therebetween, said flanges having opposed surfaces in said chamber subjected to fluid pressure with the area of the effective surface on said first-named flange greater than the area of the effective surface on said second-named flange whereby said contact surfaces are urged into engagement by a differential pressure defined by said differences in effective area multiplied by said fluid pressure, means for rotating said floating member from said annular member, and a flexible diaphragm interposed between said floating member and said annular member to seal the pressure acting in said chamber on said floating member from the clearance between said floating member and said annular member.

5. In a shaft sealing device, in combination with a shaft and surrounding housing means, a stationary contact element carried by said housing means and providing an annular contact surface, an annular member mounted on the shaft for rotation therewith and forming a fluid-tight joint therewith, an axially movable contact member interposed between said first-named element and said annular member, said floating member comprising a pair of radially extending flanges defining therebetween a chamber subjected to fluid pressure, said flanges having opposed surfaces in said chamber of different areas subjected to said pressure and the flange having the surface of larger area having an annular contact surface in rubbing engagement with the contact surface on said first-named element, means for rotating said contact member from said annular member, the clearance between said annular member and said contact member being in communication with atmosphere through the clearance between said contact member and said shaft, and means for sealing the clearance between said contact member and said annular member from the pressure in said chamber to prevent leakage of pressure fluid therethrough.

6. In a shaft sealing device, in combination with a shaft and surrounding housing means, a stationary contact element carried by said housing means and providing an annular contact surface, an annular member mounted on the shaft for rotation therewith and forming a fluid-tight joint therewith, a generally cylindrical member channel-shaped in axial section mounted to float on said shaft between said first-named element and said annular member, said floating member having a radially extending flange provided with a contact surface for engagement with the contact surface on said first-named element and said floating member having a second radially extending flange of less radial extent than said first-named flange, said flanges being spaced to provide a fluid pressure chamber and having opposed surface subjected to fluid pressure with the area of the effective surface on said first-named flange greater than the area of the effective surface on said second-named flange whereby said contact surfaces are urged into engagement by a differential pressure defined by said differences in effective area multiplied by said fluid pressure, means for rotating said floating member from said annular member, the clearance between said annular member and said floating member being in communication with atmosphere through the clearance between said floating member and said shaft, and means for sealing the clearance between said floating member and said annular member from said chamber to prevent leakage of pressure fluid therethrough.

ORRAN B. SUMMERS.

REFERENCES CITED

The following references are of record in the file of this patent:

UNITED STATES PATENTS

| Number | Name | Date |
| --- | --- | --- |
| 664,445 | Surth | Dec. 25, 1900 |
| 1,470,621 | Jackson | Oct. 16, 1923 |
| 1,936,771 | Schellens | Nov. 28, 1933 |
| 1,945,825 | Saxe | Feb. 6, 1934 |
| 1,972,565 | Kempton | Sept. 4, 1934 |
| 2,360,372 | Snyder | Oct. 17, 1944 |

FOREIGN PATENTS

| Number | Country | Date |
| --- | --- | --- |
| 24,570 | Great Britain | of 1904 |